Oct. 11, 1932.  G. C. BEIDLER  1,882,111
PHOTOGRAPHING APPARATUS FOR DUPLEX FILM
Filed Feb. 6, 1928  4 Sheets-Sheet 3
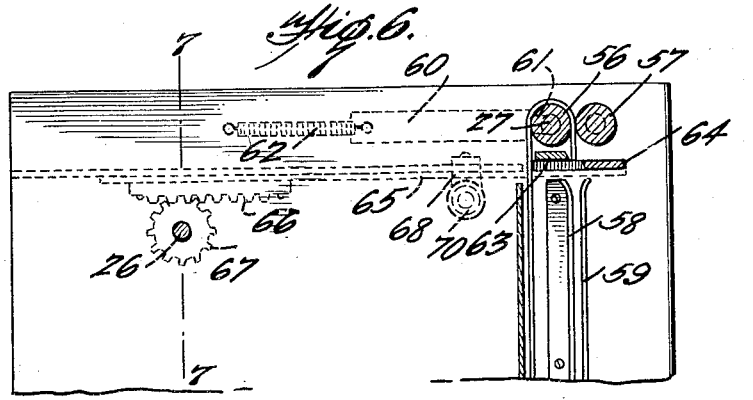
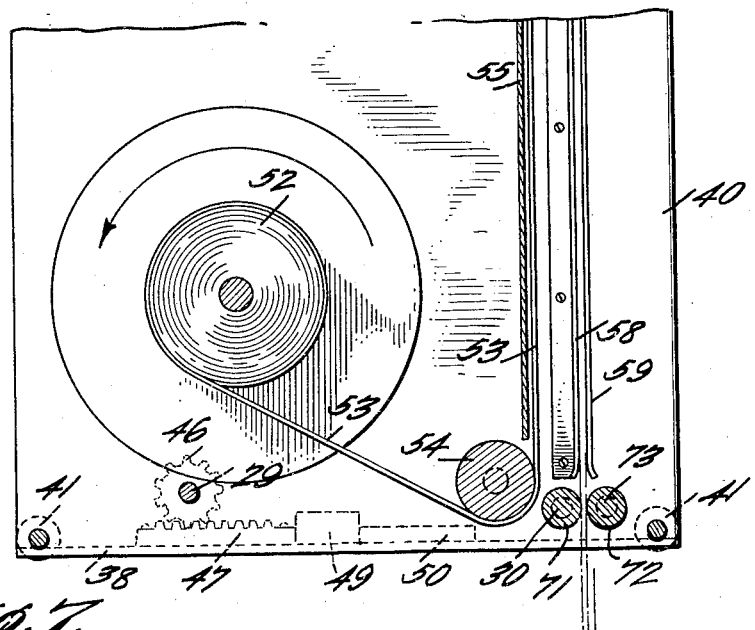
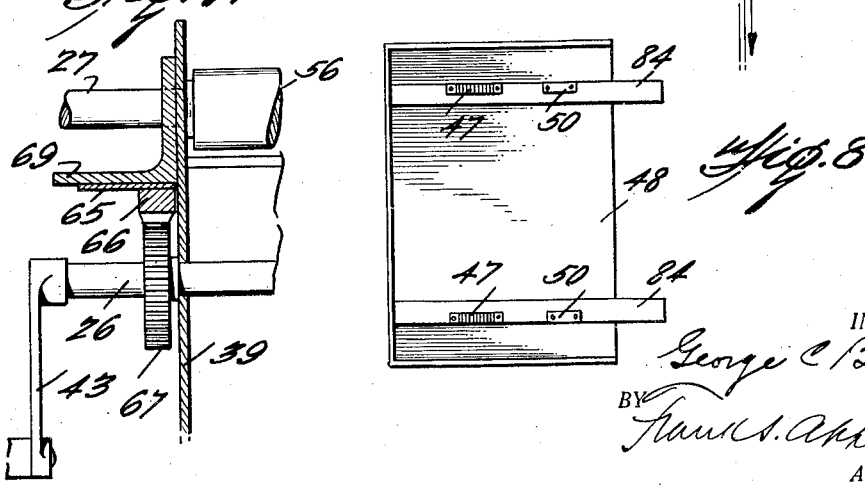
INVENTOR,
George C Beidler,
BY
ATTORNEY.

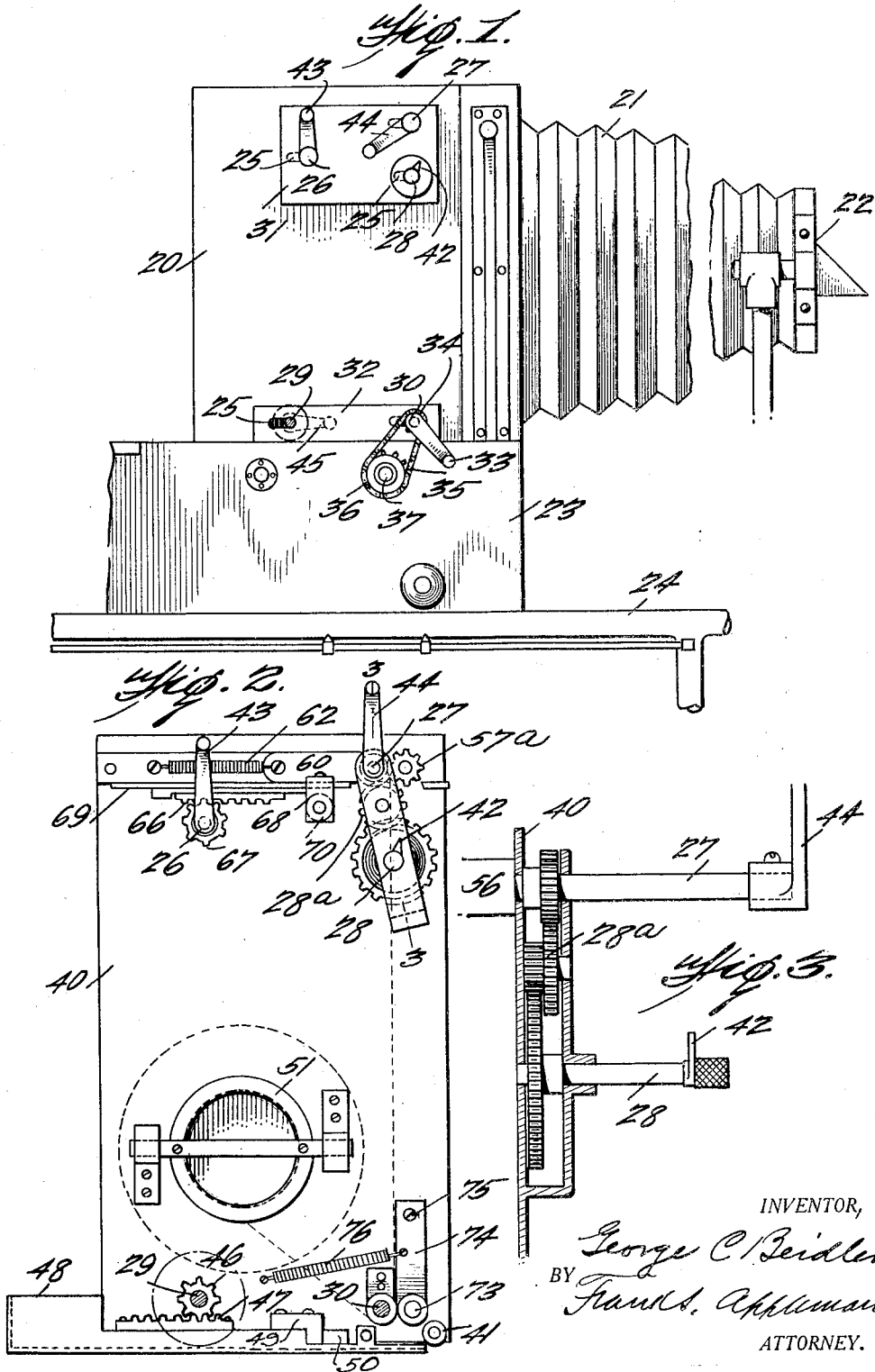

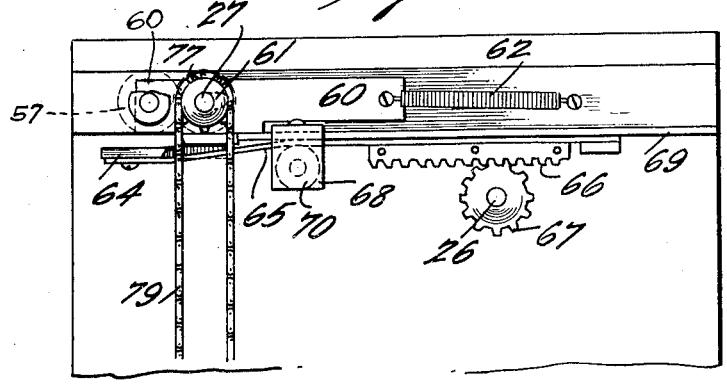
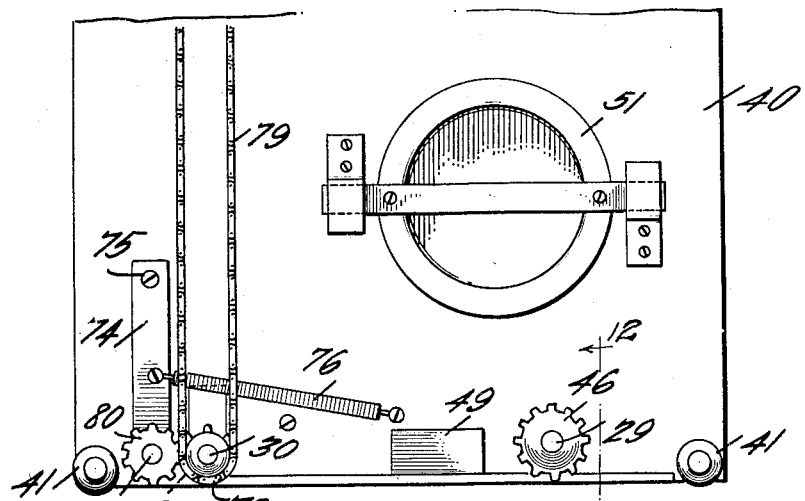
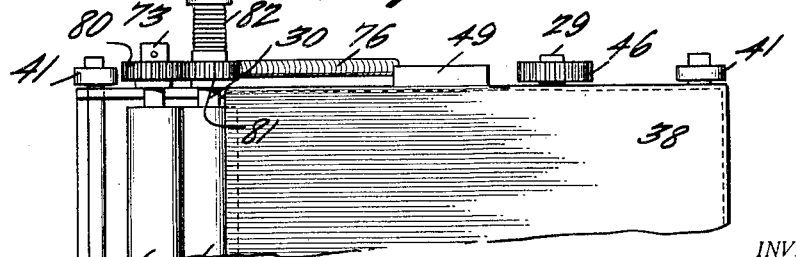
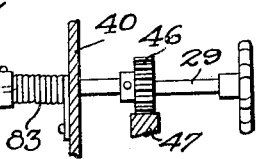

Oct. 11, 1932.  G. C. BEIDLER  1,882,111
PHOTOGRAPHING APPARATUS FOR DUPLEX FILM
Filed Feb. 6, 1928  4 Sheets-Sheet 4
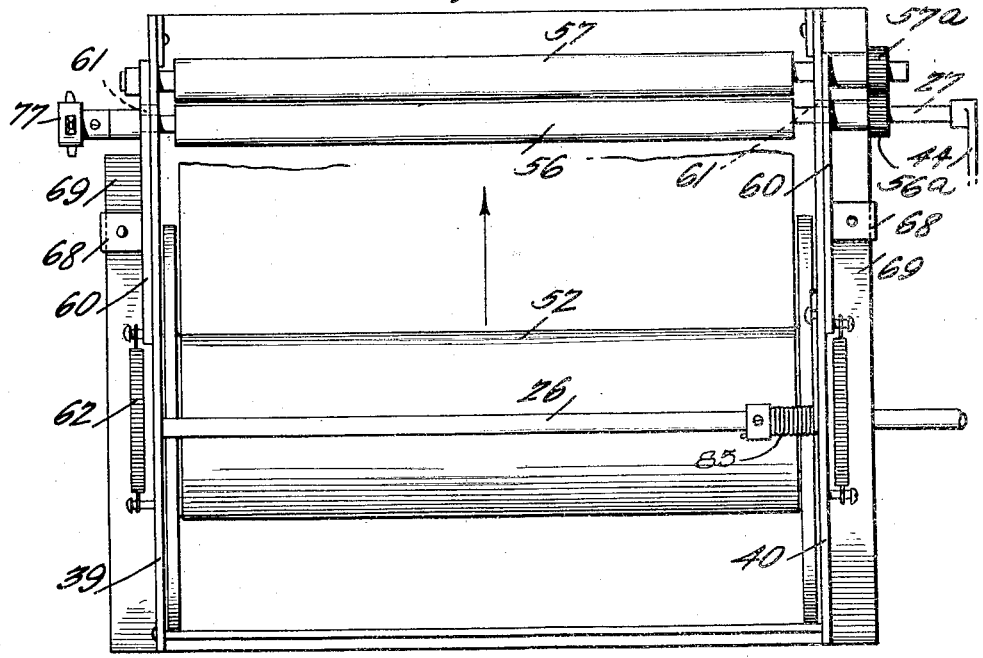
Fig. 9.
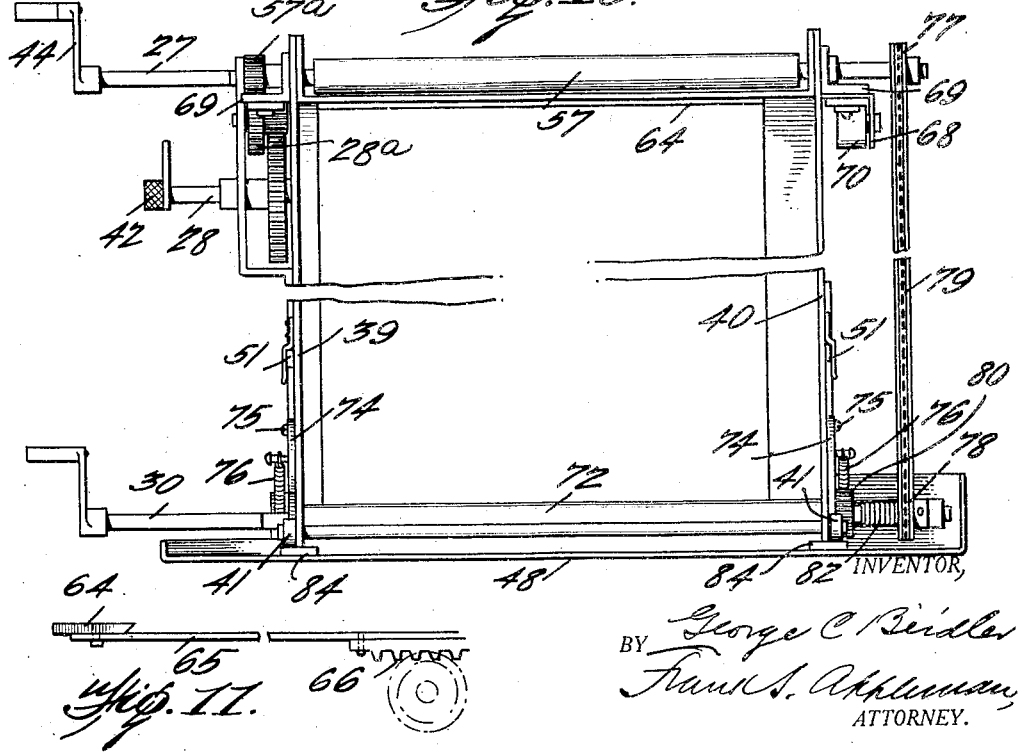
Fig. 10.
Fig. 11.
INVENTOR,
BY George C Beidler
ATTORNEY.

Patented Oct. 11, 1932

1,882,111

UNITED STATES PATENT OFFICE

GEORGE C. BEIDLER, OF ROCHESTER, NEW YORK

PHOTOGRAPHING APPARATUS FOR DUPLEX FILM

Application filed February 6, 1928. Serial No. 252,402.

This invention relates to photography, and particularly to a photographic apparatus operative to expose film that is sensitized on both sides, such film being now known in the art as "duplex" film, as distinguished from film coated on one side which is known as "simplex", so that in the further reference to duplex film, it will be understood that double coated film is meant.

In the apparatus used commercially at the present time, the film comprises sensitized paper, although, of course, celluloid or other flexible film may be treated or exposed in the apparatus of this invention.

It is an object of this invention to provide novel means for exposing one side of a duplex film and thereafter moving the film to present the opposite side of the film to the exposing instrumentality, which usually consists of a lens, associated with a prism, although the particular features for exposing film to light are not a part of the present invention.

It is a further object of this invention to hold a film in a focal plane during the initial exposure referred to and to move the film in the direction of its advancing or front edge thereafter and turn it to bring the side opposite that exposed into the field of the light projecting means, and furthermore to provide means for positioning the film in the focal plane. It is furthermore an object to provide means for removing the film from the exposing chamber after the aforesaid steps have been completed.

The advancing front edge of the film as it is moved into and through the exposing chamber results in the said film moving longitudinally of the web, although if film cut in short lengths were employed, the action might be described in somewhat modified language, but it is intended by the inventor that any movement imparted to the film whereby it is moved in substantially the same way that it is moved by this apparatus shall be comprehended by this description.

In a more specific sense, it is an object of the invention to provide means for holding a web of film or a length of film from which lengths may be cut after exposure or during the steps leading up to the exposure of the film and its removal from an exposing chamber of the apparatus.

It is a further object of the invention to provide film cutting means, film moving or transferring means and other instrumentalities, by which in successive steps, movements, or operations of parts of the apparatus, successive duplex films will be moved into an exposing chamber and subjected to the action of the light projecting means through the presentation successively of the two sides of the duplex film to the light projecting means, the said film being cut at an appropriate time from the web of film in order that the severed portion exposed on both sides may be withdrawn from the exposing chamber.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a fragment of an apparatus in which the invention is installed;

Figure 2 illustrates a view in elevation of a carriage or mounting movable within a casing;

Figure 3 illustrates an enlarged sectional view on the line 3—3 of Fig. 2;

Figure 4 illustrates a somewhat enlarged view of the opposite side of the said carriage;

Figure 5 illustrates a plan view of a fragment of the carriage;

Figure 6 illustrates a sectional view of said carriage and parts therein, the same being partly in elevation;

Figure 7 illustrates a sectional view on the line 7—7 of Fig. 6;

Figure 8 illustrates a plan view on a reduced scale of the base or tray in which the carriage is mounted;

Figure 9 illustrates a plan view of the carriage;

Figure 10 illustrates a view in front elevation of the carriage;

Figure 11 illustrates a detail view of the movable cutter; and

Figure 12 illustrates a sectional view of a fragment of the device on the line 12—12 of Fig. 4 omitting the structure beyond the shaft.

The apparatus will preferably include a casing 20 which is light-proof and it may be associated with any light projecting means, but as such instrumentalities are well known in the art, it is thought unnecessary to show them in detail. However, a bellows 21 and a conventional type of lens and prism 22 are shown in association with the case. The case is here shown as mounted on a base 23 and it may be supported by any suitable frame or stand, a portion of which is identified by the numeral 24. The case 20 has slots 25 which preferably extend horizontally and these constitute clearances for the shafts 26, 27, 28, 29 and 30 which are mounted on a carriage within the case and they move with the said carriage, as will be presently explained, during the operation of the apparatus. One group of slots is covered by a plate 31 and two other slots are covered by a plate 32 in order that light may not enter the exposing chamber through the slots. The shaft 30 has a crank 33 and it also has a sprocket wheel 34 engaged by a sprocket chain 35, operating over a sprocket wheel 36 on a shaft 37. The shaft 37 is a part of a film moving means which is driven or operated for disposing of the film after it has been drawn from the exposing chamber. There are many types of film moving or disposing apparatus or transfers so that for the purpose of the disclosure of this invention, it is believed unnecessary to further illustrate the means for disposing of the film after it has been removed from the exposing chamber.

The carriage, to which reference has been made in the present embodiment, comprises a bottom plate 38 with upstanding sides 39 and 40. Preferably supporting rollers 41 are mounted at the corners of the carriage in order that the carriage may move within the case. The shafts 26, 27, 28, 29 and 30 are journaled in the sides of the carriage and project through the case in order that they may be manipulated from the exterior of the case, except as to the shaft 28, whose function it is to carry an indicator 42 for the convenience of the operator in determining the length of film displaced during the manipulation of the feeding or film moving means, the shaft 28 being driven through a train of gearing 28a.

The shaft 26 has a handle or crank 43 and likewise the shafts 27 and 29 have cranks or hand grasps 44 and 45, respectively, arranged externally of the case. The shaft 29 carries pinions 46, one of which is arranged on the shaft at each side of the carriage. These pinions mesh with racks 47 arranged on a base plate or tray 48 on the floor of the case. The carriage has a lug or an abutment 49 on one of its sides and this lug strikes an end of one of the racks 47 to limit the movement of the carriage in one direction. The base of the tray is also provided with a stationary element 50 that is engaged by the lug to limit the motion of the carriage in the direction opposite that of the rack, and the distance which the carriage may move is predetermined and is made proportional, in the present instance, to the diameter of a roller over which the film moves while it is being shifted to present the sides of the film to the exposing chamber.

The sides of the carriage are supplied with a spool holding device including plates 51 which are held on the sides of the carriage, and the plates have projections reaching into the carriage on which the spool or roll of film may be rotatably mounted. A device of this type is shown in my Patent Number 1,664,730, dated April 3, 1928 and need not, it is thought, be further described herein. The roll of film 52 is shown within the carriage and a length of film 53 is shown in engagement with a roller 54. The film is extended upwardly between the sides of the carriage, and a guide plate and mask 55 is arranged in the carriage back of the location of the upwardly extended portion or length of film. The plate 55 serves as a guide for the film and it also aids in preventing the fogging of the unexposed side of the film during the initial exposure of the film. Feed rollers 56 and 57 are rotatably mounted in cooperative relation near the top of the carriage and the film is fed therethrough and downwardly between guides 58 and 59, a pair of which is provided on each side of the carriage. The roller 56 is mounted or made a part of the shaft 27 and when the crank 44 is turned, the rollers 56 and 57 will coact to draw film from the roll of film and to push it downwardly in the exposing chamber between the guides 58 and 59. The rollers are moved in unison through the employment of gear wheels 56a and 57a.

The trunnions of the roller 57 are mounted in slidably arranged plates or bearings 60 and each plate is provided with a slot 61 through which the shaft of the roller 56 projects and this permits the bearings 60 to move with respect to the shaft of the roller 56 in order that the roller 57 may be adjusted or have movement with relation to the roller 56. Each plate, in the present embodiment, is under the tension or pull of a spring 62 and the rollers 56 and 57 are therefore held in such relation to each other as to insure proper frictional engagement of the rollers with the film.

As here shown, a stationary knife 63 is located under the roller 56 and its cutting edge is practically in alinement with the coacting peripheries of the rollers 56 and 57. A movable knife 64 coacts with the stationary knife and it is supplied with arms 65, preferably resilient in character. A rack 66 is secured to each arm and each rack is engaged by a pinion 67 mounted on the shaft 26 so that as the shaft is rotated or partially rotated, it will serve to operate the movable knife into coactive relation with the stationary knife. A bracket 68 is secured to a flange 69 on each side of the carriage and each bracket carries a roller 70 which is positioned to engage an arm 65 and hold the knife 64 in coactive relation with the stationary knife.

After film has been exposed on one side and then moved downwardly between the guides 58 and 59, it reaches the zone of action and is engaged by rollers 71 and 72 by which the film is drawn from the exposing chamber. The roller 71 is mounted on or made a part of the shaft 30 and the shaft 73 or trunnions of the roller 72 are mounted in hangers or bearings 74, each of which is oscillatably supported, as at 75. Each hanger is under the tension or pull of a spring 76 which serves to insure proper tensioning of the rollers 71 and 72 on the film.

The shaft 27 and the shaft 30 at the ends opposite those shown in Fig. 1 are supplied with sprocket wheels 77 and 78, respectively, connected by a sprocket chain 79. The shafts 30 and 73 are provided with intermeshing gears 80 and 81 in order that movement imparted to the shaft 30 by the sprocket chain will serve to drive the rollers 71 and 72. The shaft 30 has a clutch, preferably a spring clutch, 82 so anchored to the sprocket wheel 78 and operative to grip the shaft when the sprocket wheel is driven that the clutch will leave the shaft 30 free to be turned independently of the sprocket wheel 78 when the said shaft is manipulated through the employment of the crank 33. The arrangement of parts is therefore such that when the roller 56 is turned, the rollers 71 and 72 will likewise be turned in order that they will grip the film fed downwardly between the guides, but after the film is cut, the rollers 71 and 72 may be operated independently of the rollers 56 and 57 for drawing the film out of the exposing chamber and leaving the remaining end of the film between the rollers 56 and 57 for a repetition of the operation.

The tray is preferably provided with tracks 84 on which the racks 47 and the stationary elements 50 are located and the wheels of the carriage move on the tracks, and the carriage is guided between the sides of the racks and stationary elements.

The movable knife is retracted through the force of a spring 85 on the shaft 26.

Assuming now that a film has been drawn from the exposing chamber, and that the film 53 in the position in which it is shown in Fig. 6 is in the focal plane of the light projecting means, an exposure will be made on the film. Thereafter, the rollers 56 and 57 will be turned and the film will be fed downwardly between the guides 58 and 59 and the film will be turned, presenting the former rear side of the film to the light admitting or projecting means. Obviously, the film so positioned will be in advance of the focal plane to the extent of the diameter of the roller 56 over which the film has moved. In order to place the film in the focal plane, the shaft 29 is partially rotated and the opinions thereon engaging the racks move the carriage rearwardly with respect to the light propecting means. As has been stated, the lug 49 engages an abutment when the predetermined and required distance is traveled for locating the film again in the focal plane. The shaft 29 being released, and being under the influence of a spring 83, is automatically returned to the first mentioned position, and after the film is severed and removed from the exposing chamber through the instrumentalities before described, the newly placed length of film is in the focal plane and repetitions of the operations may be had.

I claim:

1. In a photographing apparatus, a light projecting means, an exposing chamber, means for drawing film into the exposing chamber and holding it in the focal plane, means for moving the film endwise and reversing the film to present its opposite side to the light projecting means, and means for creating relative movement of the exposing chamber and light projecting means longitudinally of a ray of light issuing from the light projecting means whereby the film is positioned within the focal plane of the light projecting means.

2. In a photographing apparatus, an exposing chamber associated with means for photographically exposing film therein, means for moving film in the exposing chamber to the focal plane of the exposing means and presenting one side of the film to the said exposing means, means for moving the film endwise in the exposing chamber from the field of the exposing means, reversing it and re-positioning it in the field of the exposing means, and means for creating relative movement of the exposing chamber and the exposing means for focusing the film in the aforesaid positions.

3. In a photographing apparatus, an exposing chamber, a member movable in the chamber, means in the member for holding a length of film, means associated with the member for moving the film endwise into the field of a film exposing means, means for moving a length of the film from the said field and re-presenting it in the said field with its opposite side facing the exposing means, means for creating relative movement of the member and the exposing means whereby the film is located in the focal plane of the exposing means in the aforesaid positions of the film, means for drawing the exposed portion of the film from the exposing chamber, and means whereby the first mentioned film moving means communicates motion to the film drawing means.

4. In a photographing apparatus, an exposing chamber for film, means for drawing film into the exposing chamber and holding it therein for exposure and for moving the film endwise and reversing the same for exposure of its opposite side, means for creating relative movement of the film holder and light projecting means of the apparatus whereby the film in its different positions is maintained in the focal plane of the light projecting means during exposure, and means for removing the film from the exposing chamber after its exposure.

5. In a photographing apparatus, an exposing chamber for film, means for holding film in the exposing chamber for exposure, means for moving the film endwise out of the field of a light projecting means of the apparatus and for returning the film to said field in reversed position for exposure of its opposite side, means for creating relative movement of the film holder and the light projecting means of the apparatus whereby the film in its different positions is maintained in the focal plane of the light projecting means during exposure, and means for moving the film from the exposing chamber.

6. In a photographing apparatus, an exposing chamber for film, means for drawing film into the exposing chamber for exposure and moving it endwise therein and reversing the film for the exposure of its opposite side, means operated independently of the said means for drawing film for removing film from the exposing chamber, and means for operating the means for drawing film and the means for removing film simultaneously.

7. In a photographing apparatus having means for exposing film to light, an exposing chamber, means for drawing film into the chamber in the focal plane of the exposing means and for moving the film endwise from the field of exposure, reversing it and presenting its opposite side to the exposing means in the field thereof, and means for shifting the exposing chamber for positioning the film in the focal plane of the exposing means as the two sides of the film are successively exposed.

8. In a photographing apparatus having means for exposing film to light, an exposing chamber, means for drawing film into the chamber in the focal plane of the exposing means and for moving the film endwise from the field of exposure, reversing it and presenting its opposite side to the exposing means in the field thereof, means for moving the exposing chamber in one direction with respect to the exposing means for positioning the film in the focal plane, and means for moving the exposing chamber in the opposite direction for locating the reverse side of the film in the focal plane in its changed position.

9. In a photographing apparatus having means for exposing film to light, an exposing chamber, means for drawing film into the chamber in the focal plane of the exposing means and for moving the film endwise from the field of exposure, reversing it and presenting its opposite side to the exposing means in the field thereof, means for creating relative movement of the exposing chamber and the exposing means for focusing the film in one position and for creating relative movement of the exposing chamber and film exposing means in another direction to establish a focus for exposing the opposite side of the film in its changed position.

10. In a photographing apparatus, an exposing chamber associated with means for exposing films therein, to which double coated films are delivered in position to expose one side thereof, means for reversing the position of the film in the exposing chamber, and means for creating relative movement of the exposing chamber and the exposing means toward and from each other for focusing the film in the aforesaid positions.

11. In a photographing apparatus, an exposing chamber associated with means for exposing films therein, to which double coated films are delivered in position to expose one side thereof, means for moving the film endwise in the exposing chamber and reversing the position of the film with respect to the exposing means, and means for creating relative movement of the exposing chamber and the exposing means in the direction of a light ray for focusing the film in the aforesaid positions.

12. In a photographing apparatus, an exposing chamber associated with means for exposing films therein, to which double coated films are delivered in position to expose one side thereof, means for reversing the position of the film in the exposing chamber, and means for creating relative movement of the exposing chamber and the means for exposing film to and fro in a line substantially longitudinally of a light ray admitted to the exposing chamber when the film is exposed, when the film is in said positions.

GEORGE C. BEIDLER.